R. H. WEBER.
REPAIR PLUG.
APPLICATION FILED FEB. 24, 1908.

926,371.

Patented June 29, 1909.

Witnesses

Inventor
R. H. Weber
By
Attorneys

UNITED STATES PATENT OFFICE.

ROBERT H. WEBER, OF SIOUX FALLS, SOUTH DAKOTA.

REPAIR-PLUG.

No. 926,371.  Specification of Letters Patent.  Patented June 29, 1909.

Application filed February 24, 1908. Serial No. 417,408.

*To all whom it may concern:*

Be it known that I, ROBERT H. WEBER, citizen of the United States, residing at Sioux Falls, in the county of Minnehaha and State of South Dakota, have invented certain new and useful Improvements in Repair-Plugs, of which the following is a specification.

It is well known that the ordinary form of plug used to repair a pneumatic tire cannot be effectually employed to close an opening in the tire larger than the stem of said plug, and also that said plugs will not withstand pressure and are thus bulged out at the weakened portion of the tire and often permit the tire to "blow out" at such point.

The object of this invention is an improved plug which is designed to be applied to pneumatic tires to effectually repair a puncture therein, and is thus particularly adapted for use with automobile tires; which may be employed to close holes in the tire of greater diameter than the stem of the plug, and which will prevent any excessive strain upon the weakened portion of the tire, and thus will not bulge out or permit the tire to "blow out" at such point.

With this and other objects in view, that will more fully appear as the description proceeds, the invention consists in certain constructions and arrangements of the parts that I shall hereinafter fully describe and claim.

Figure 1:
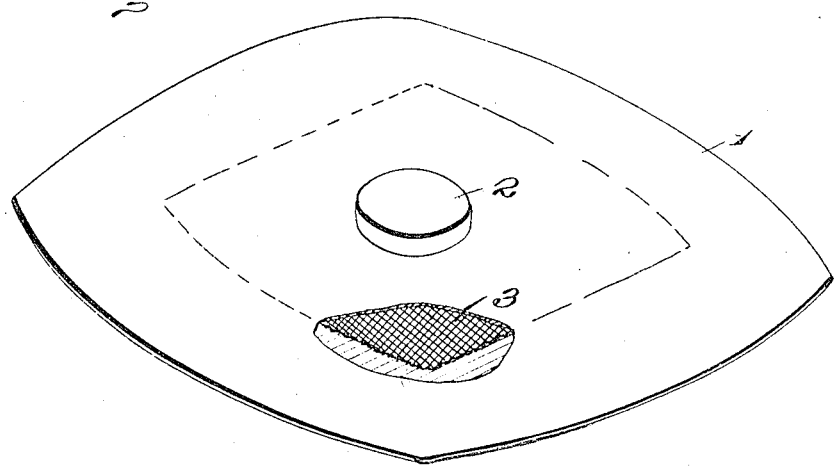
Figure 2:
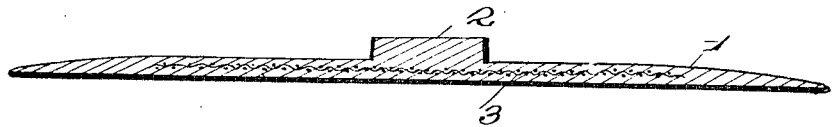

For a full understanding of the invention and the merits thereof, reference is to be had to the following description and the accompanying drawing, in which:

Figure 1 is a perspective view, partly broken away, of my improved repair plug. Fig. 2 is a sectional view thereof.

Corresponding and like parts are referred to in the following description and indicated in all the views of the drawing by the same reference characters.

My improved repair plug is preferably constructed of rubber, and comprises a body portion 1 which is preferably flat and may be of any desired size or shape, and a stem 2 which projects outwardly from the middle point of one side of the body portion. The body portion is provided with a reinforcing member 3 which, in the present instance, is formed of pliable wire netting vulcanized within the body portion, as shown, the edges of the body portion being flexible and tapering outwardly beyond the reinforcing member; the latter thus lying entirely within the margin of the body portion and terminating comparatively far short of said margin so as to prevent the edge of the reinforcing member from projecting through the edge of the body portion to snag or otherwise injure the tire.

In the practical use of my improved repair plug, when the latter is applied to a punctured tire, the reinforcing portion of the plug extends beyond the weakened portion of the tire, and although the body portion of the plug yields sufficiently to conform to the contour of the tire, it retains its shape under pressure and thus prevents any excessive strain upon the weakened portion of the tire. It will be noted that as the portion of the plug contiguous to the stem 2 thereof is reinforced or stiffened, the plug may be effectually employed to close openings in the tire which are of greater diameter than the stem 2.

From the above description, in connection with the accompanying drawing, it will be apparent that I have provided a simple, durable and efficient construction of a repair plug for pneumatic tires, the use of which is obvious.

Having thus described the invention, what I claim is:

A repair plug of the character described, comprising a relatively flat body portion 1 formed with a stem 2 projecting outwardly from one side, and a wire mesh reinforcement 3 embedded centrally within the body portion and terminating short of the margin thereof to provide flexible edge portions, said wire mesh extending beyond the stem to provide a reinforced portion all around the same, as and for the purpose specified.

In testimony whereof I affix my signature in presence of two witnesses.

ROBERT H. WEBER. [L. S.]

Witnesses:
  LOUIS CAILLE,
  R. G. PARUNEY.